Nov. 12, 1929.  B. F. STOWELL  1,735,804
COLLET
Filed May 18, 1929   3 Sheets-Sheet 1

INVENTOR.
Byron F. Stowell
BY
Chapin Neal
ATTORNEYS.

Nov. 12, 1929.         B. F. STOWELL                 1,735,804
                          COLLET
                     Filed May 18, 1929         3 Sheets-Sheet 2
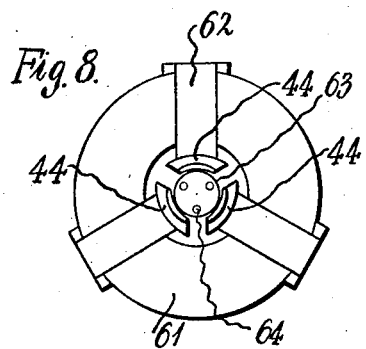
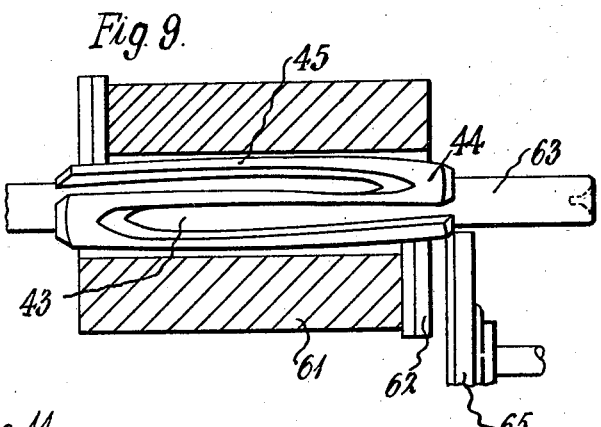
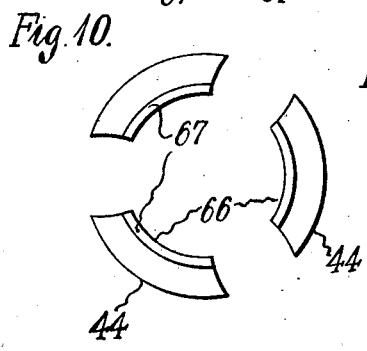
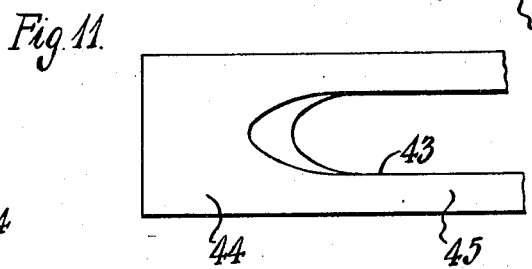
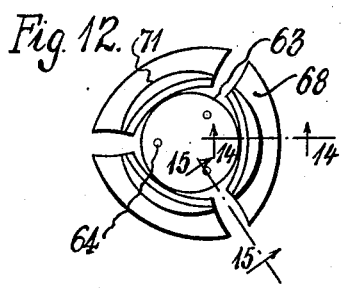
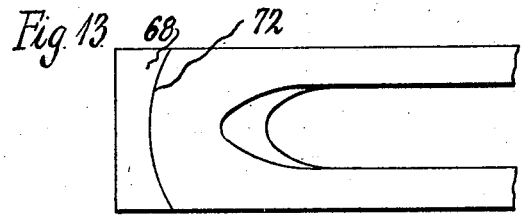
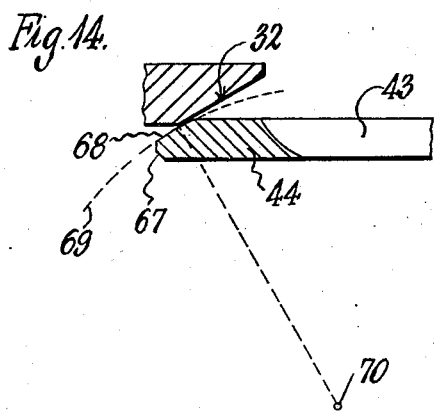
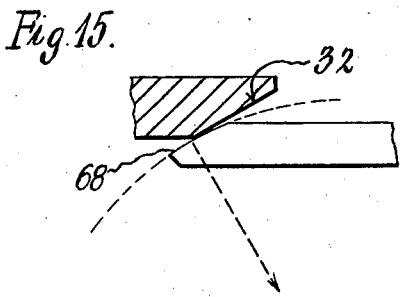
INVENTOR.
Byron F. Stowell
BY Chapin & Neal
ATTORNEYS.

Nov. 12, 1929.  B. F. STOWELL  1,735,804
COLLET
Filed May 18, 1929  3 Sheets-Sheet 3

INVENTOR.
Byron F. Stowell
BY
ATTORNEYS.

Patented Nov. 12, 1929

1,735,804

UNITED STATES PATENT OFFICE

BYRON F. STOWELL, OF SPRINGFIELD, MASSACHUSETTS, ASSIGNOR TO VAN NORMAN MACHINE TOOL COMPANY, OF SPRINGFIELD, MASSACHUSETTS, A CORPORATION OF MASSACHUSETTS

COLLET

Application filed May 18, 1929. Serial No. 364,128.

This invention relates to the improvement of collets of the double end type. It has for its principal object the production of a collet of this general type having a much greater range of adjustment than has been attainable in former collets. A further object is to preserve substantially the same degree of accuracy at all conditions of adjustment of the collet. The exact meaning of these objects, as well as the manner of their attainment, will be clear from the following description.

This application is a continuation in part of my prior copending application Serial No. 246,011, filed January 11, 1928.

Referring to the drawings:

Fig. 8 is an end view of a chuck for holding the collet during the grinding of its ends;

Fig. 9 is a diagrammatic side elevation showing the grinding operation;

Fig. 10 is an end elevation, on an enlarged scale, showing the collet before the initial grinding of its ends, the collet being considered in this and in subsequent similar views as having its portions adjacent one end only visible;

Fig. 11 is a side elevation of one of the members or branches of the collet in the condition shown in Fig. 10;

Figs. 12 and 13 are similar views showing the initial grinding of one end of the collet;

Fig. 14 is an enlarged section on line 14—14 of Fig. 12, showing the collet as in contact with its outer cone;

Fig. 15 is a similar enlarged section on line 15—15 of Fig. 12;

Figure 16:
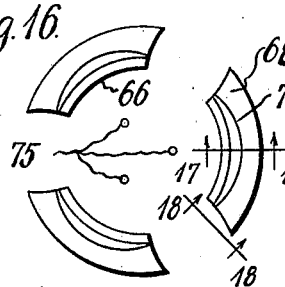
Fig. 16 is a view similar to Fig. 12 but showing the collet expanded.
Figure 19:
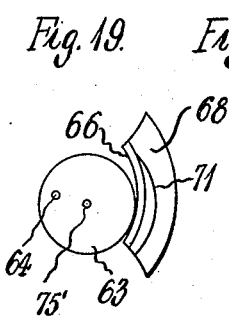
Figure 20:
Figure 21:
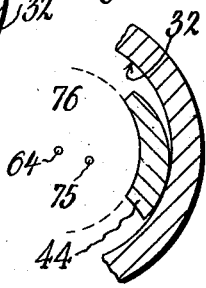
Figure 17:
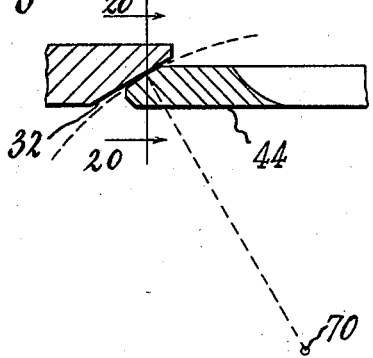
Figure 18:
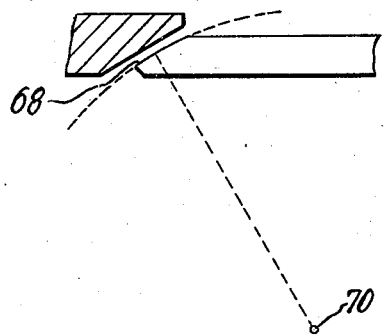
Figure 22:
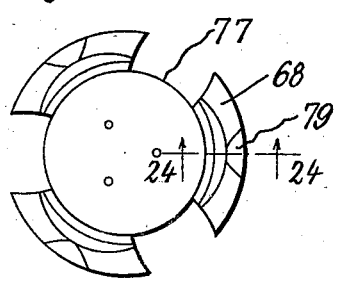
Figure 23:
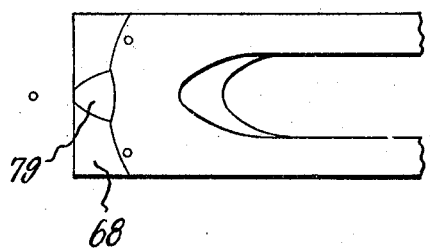
Figure 24:
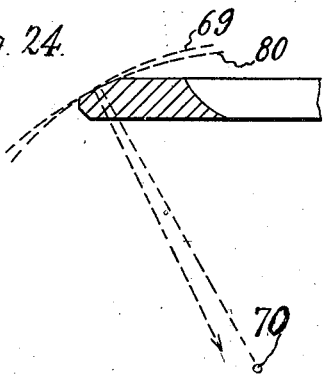

Figs. 17 and 18 are views similar to Figs 14 and 15, but are taken respectively on lines 17—17 and 18—18 of Fig. 16;

Fig. 19 is a view corresponding to a portion of Fig. 12 but illustrating the effect of a distortion in one of the collet branches;

Fig. 20 is a section on line 20—20 of Fig. 17, showing the normal expansion of a collet branch against the outer cone;

Fig. 21 is a similar view showing the effect on the expanded collet of grinding one of the collet branches in the distorted condition of Fig. 19;

Figs. 22 and 23 are views corresponding generally to Figs. 12 and 13 but illustrating the manner of giving a preferred second grinding to the end of the collet; and Fig. 24 is a section on line 24—24 of Fig. 22 showing the preferred way of giving this second grind.

Figure 1:
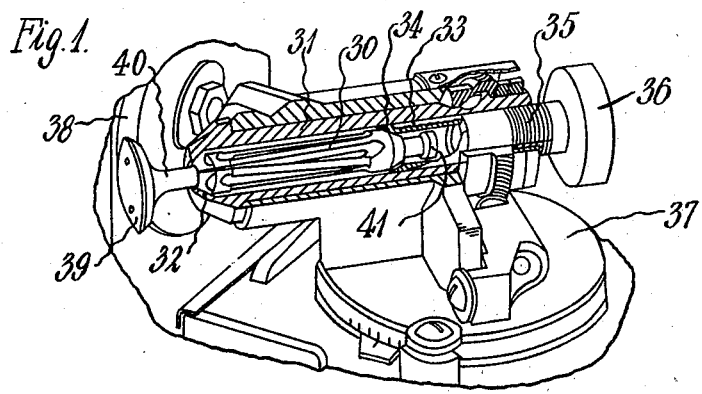
Fig. 1 is a diagrammatic perspective view, partly in section, illustrating the improved collet and its manner of use.

While the details of the invention can be understood best from the other figures, its environment will be first considered with reference to Fig. 1. The collet 30 is shown as positioned within a sleeve 31 having one contracted conical inner end surface 32. A second sleeve 33, having a conically formed inner end surface 34, is mounted for sliding movement within the first sleeve, and is controlled in its position in the direction of the axis of the sleeve by a plunger 35 screw threaded into the sleeve 31 and provided with a suitable handwheel 36. By rotating the hand-wheel, the two interiorly conical surfaces 32 and 34 can be caused to approach or to recede from each other, and therefore to exert a contracting force upon the ends of the collet in a well known manner. The sleeve 31 may be supported upon a head 37 suitably provided with work feeding and indexing devices by means of which the work, such as a valve, may be positioned in proper relation to a tool such as a grinding wheel 38.

While the collet of my invention is of utility in holding any type of cylindrical work-pieces, and in this use possesses a range of adjustment entirely beyond anything possible with double end collets of previous designs, it is of particular utility in dealing with a type of gasoline engine valve which has recently come into use. This type of valve has a head 39, a cylindrical shank 40, and an integral tappet block 41 formed at the end of the shank. Previous to my invention, it has been impossible to handle valves of this type in a chuck of the double-end collet variety, as the collets did not have sufficient range to permit the tappet block to be slipped through them and the reduced diameter of the shank then gripped. The manner in which this difficulty has been overcome in the improved collet of my invention will now be considered.

Figure 2:
Figs. 2 and 3 are respectively end and side views showing the blank from which the improved collet is made.
Figure 3:
Figure 4:
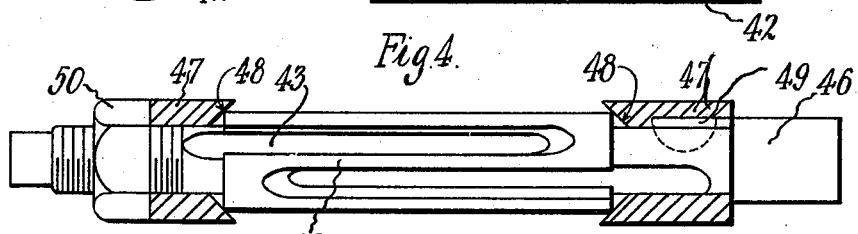
Figs. 4 to 7 are diagrammatic views illustrating successive stages in the manufacture of a collet according to my invention.
Figure 5:
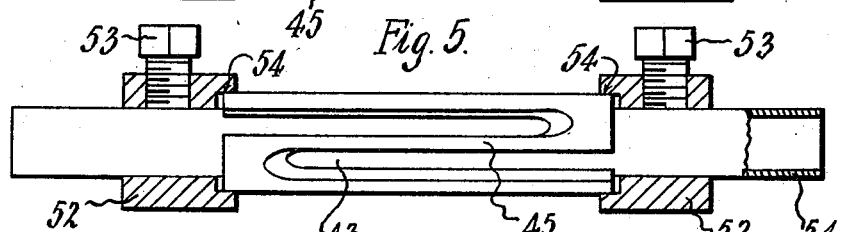
Figure 6:
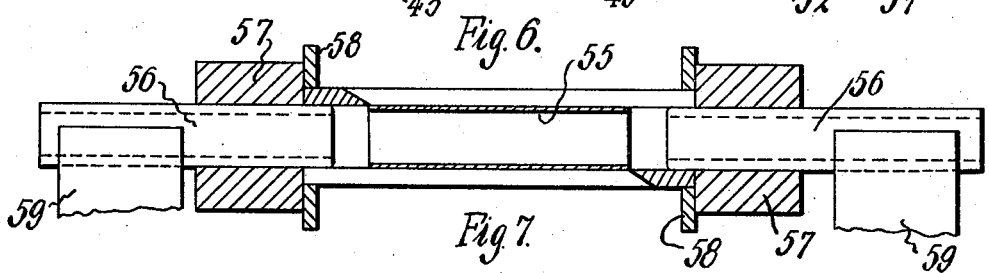
Figure 7:
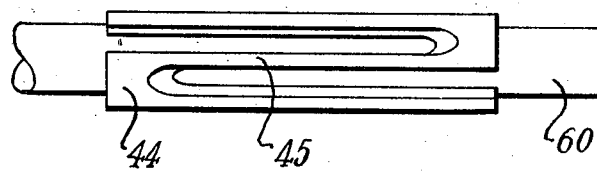

The improved collet is in its superficial aspects somewhat similar to those previously used. It is perhaps best illustrated in its entirety in Fig. 9. Formed from a cylindrical blank 42 (Figs. 2 and 3), cuts 43, made alternately from opposite ends of the blank and extending parallel to its axis nearly but not quite the full length of the cylinder, divide it into end segments 44 and intermediate bridge members or connecting bars 45. The segments are preferably three in number at each end, and the segments of the two sets are staggered with relation to each other. At this point, however, the resemblance between the improved collet and those of earlier design ceases. The former designs were not capable of anything like the range of adjustment which is possible with my improved collet, and the description will be continued with especial reference to those features which make possible both the range of adjustment and the preservation of the inherent accuracy of the collet throughout this range.

The first feature of construction to be considered under this head is the hardening and tempering of the collet. This can best be understood by a reference to Figs. 4 to 7 inclusive, where the various steps of forming and hardening the collet are shown. Starting with the cylindrical blank 42 of Figs. 2 and 3, the first operation is to cut the slots 43. This may be done with a straight or beveled cutter, but is preferably done with a rounded cutter as shown so that abrupt changes in angles are avoided and a more even flexibility given to the bridge members 45 where they join onto the end segments. During the operation of cutting the slots, the blank is held to an arbor 46 by opposed collars 47, each having an internally tapered surface 48 bearing against the end of the blank. One of the collars is held to the arbor against a shoulder thereof and is positioned by a key 49; the other is adjustably held by a lock nut 50 so that it can be removed from the arbor. Both the arbor and the collars are suitably slotted to permit the passage of the cutting tool. It will be noted that the collars clamp the blank firmly against the arbor, preventing any distortion or shifting of the segments of the collet as they are being cut.

The slotted blank is then placed upon a tube 51 (Fig. 5) to which it is clamped by collars 52 secured to the tube as by set screws 53 and having bearing surfaces 54 for the ends of the blank. The tube with the blank clamped upon it is then placed in a muffle or is otherwise suitably heated to the proper temperature for hardening, the hollow tube permitting the blank to become evenly heated. During the heating, warping of the slotted blank is prevented by the coaction of the tube and the collars. During the subsequent chilling of the blank for the purpose of hardening it, the clamps may be removed; but preferably they are left in place in order to further guard against warping.

It is now necessary to draw the temper of the connecting bars 45 so that they will be springy and not brittle. This operation is also preferably utilized for the purpose of giving a slight outward bow to the bridge members which has several desirable features. In the first place, the bowing serves to localize the pressure of the finished collet on the work piece within an area adjacent the ends of the collet jaws, thus increasing the accuracy with which the work piece is held. In the second place, the bowing prevents any friction between the center section of the collet and the work piece which would introduce difficulties into the insertion or removal of work pieces from the collet. Again, as a corollary to the statements above, the bowing, by preventing contact of the center of the collet with the work piece, eliminates the necessity of accomplishing these objects by machining the inner surface of the collet blank.

In tempering the collet blank, a tube 55, of a length less than that of the blank, is inserted in the center of the bore; and arbors 56, of a diameter slightly less than that of the tube 55, are inserted in the ends. Chuck devices 57, having jaws 58, are secured to the arbors and clamp the end sections of the collet blank firmly against the arbors to hold them against any warping or distortion. Preferably the arbors are supported in guides 59 so that they may be rotated as a flame is directed against the central part of the collet to supply the necessary tempering heat. When the correct heat has been reached, indicated by the color of the collet, the collet is cooled to preserve the desired condition of temper.

The collet blank thus hardened and tempered is ready for accurate finishing of its end surfaces by lapping and grinding. First the blank is slid upon a lapping arbor 60 (Fig. 7) with which the blank contacts only upon areas of its inner surface adjacent its ends, due to the bowing described above. The diameter of this arbor is substantially that which the collet normally assumes in the absence of any contracting force; in other words, that of the largest work pieces for which the collet is designed. The lapping is continued until the inner surface of each of the end segments of the collet has been smoothed off substantially all the way across.

The inside of each of the collet ends is thus finished to a cylindrical surface of the maximum work piece diameter.

Up to this point, the outer end surfaces of the collet (those which are to contact with the cone surfaces 32 and 34) have not been shaped. For the initial grinding of these end surfaces, the collet is clamped by a chuck member 61 (Figs. 8 and 9) having jaws 62, against an arbor 63 of a diameter substantially that of the smallest work piece for which the collet is designed. In this contracted position, the inner surfaces of the end segments 44, which were lapped upon an arbor of larger diameter, will contact with the small arbor at their central portions only (Fig. 8). The center of curvature of the inner surfaces are indicated in Fig. 8 by the small circles 64. The grinding of the outer end surfaces of the collet may be done in any desired manner, but since the end surfaces are preferably spheroidal (although not necessarily spherical) in form, the grinding is done either on an oscillating grinder or more conveniently by a formed grinding wheel 65, the arbor and grinding wheel both being rotated in the usual manner. The method followed in manufacturing these collets has been described and claimed in my copending application Serial No. 253,184, filed February 9, 1928, now Patent Number 1,716,331, granted June 4, 1929.

The detailed manner in which the outer end surfaces of the collet are generated will now be described in detail with particular reference to Figs. 10 to 24, as the mode of generating these surfaces is of great importance from the standpoint of accuracy of the collet throughout its range of adjustment. Fig. 10 shows the three segments of the collet at one end before the grinding has taken place, the segments being shown in the condition of maximum expansion, which it will be recalled is the condition in which their inner surfaces 66 are lapped. It is preferable to flare the end of the bore of the blank at 67 (see also Fig. 14) as by reaming with a bell mouth reamer before the collet is hardened, in order to avoid burrs or sharp edges.

It will be apparent that the inner faces 66 of the segments are formed as fragments of a cylindrical surface of the diameter of the largest work piece which the collet is designed to hold, and that the cylindrical outer surface of the body of the collet is concentric with this cylinder.

When the collet segments are contracted upon a mandrel for the generation of the outer end faces, they appear as in Fig. 12. The inner faces of the segments no longer appear to lie on the surface of a cylinder, nor are they concentric one with another. The several geometrical axes 64 of the individual faces 66 are indicated by small circles as in the showing of Fig. 8. With the segments compressed to the position of Figs. 8 and 12, in which contact is made with the arbor 63 at one point only on each segment, the outer faces 68 are ground, as above described. These faces are preferably ground curved, although to the naked eye the small portion of the surface visible appears more like a cone. The approximate center of this longitudinal curvature of the socket engaging faces is shown in Figs. 14, 17, 18, and 24, at 70. The curvature longitudinally of the collet is indicated in dotted lines 69 in Fig. 14, extended beyond the actual boundaries of the ground surface to make its nature clearer. The generating or geometrical axis of the spheroid, which may for convenience in considering Fig. 14 be regarded as the generated surface, is coincident with that of the arbor 63 but not with the axes of the inner faces 66 or of the outer cylindrical surfaces of the collet. The intersection of the generated surface with the outer cylindrical surface of the collet is shown at 72 in Fig. 13, appearing as a curved line.

Figs. 14 and 15 show the surface thus generated in contact with one of the conical surfaces which serve to contract the collet in use. Since the end faces of the collet are generated while it is rotating about the axis of the arbor 63, they will contact throughout the width of the collet segment with a conical surface as long as the collet is held, by contact with that surface or otherwise, at the diameter in which it was ground. The position of the point of contact on the edges of the segment may be different from that at the center, due to the eccentricity of the ground surface and the original cylindrical surfaces of the blank, as shown in Figs. 14 and 15, but nevertheless contact will be maintained throughout the width of the segment.

When the collet is expanded for the reception of the largest size of work piece for which it is adapted, a different condition results, illustrated in Figs. 16, 17 and 18. It will here be observed that whereas the inner lapped surfaces 66 have returned to the condition of expansion in which they were lapped and are therefore all on the surface of a cylinder corresponding to the diameter of the largest size work piece, the ground surfaces 68 are no longer concentric with one another but appear as if separately generated about centers indicated in Fig. 16 at 75. When, therefore, the collet is introduced within the conical surface 32, contact will be made at the middle but not at the sides (compare Figs. 17 and 18). This is also shown in Fig. 20, representing a section on line 20—20 of Fig. 17, and illustrating the transverse curvature of the collet and socket at this plane of cross-section. When the collet is in its normal expanded position the geometrical axes of the several faces 66, which are each curved transversely of the member in the form of a fragment of a surface of revolution (in this case a cylinder), are all coincident with the axis of the collet as a whole, while the individual geometrical axes 75 of the several outer faces 68 are spaced substantially symmetrically (Fig. 16) about this common axis. When the collet is compressed, as in Fig. 12, the geometrical axes of the faces 68 merge with the axis of the contracted collet, which is then coincident with the axis of the arbor or work piece upon which the collet is held, so that the edges 71 of the faces 68 appear in this figure as concentric with each other; whereas the individual geometrical axes 64 of the faces 66 become spaced substantially symmetrically with respect to this central axis. The expanded and contracted positions of the collet referred to are of course not definite limits of movement, these terms being used to refer to the differing positions at which the inner and outer faces are ground.

As long as there is no distortion of the collet in opening or closing, the structure shown is accurate throughout its entire range of adjustment. If the precautions described above with regard to the manner of holding the collet during the hardening and tempering operations are followed, the great majority of collets produced by this method will require no further treatment. A certain proportion, however, will acquire during hardening and tempering a strain which will cause a slight variation from the true position of the segments as they pass from one extreme of position to the other. This variation will not be great enough to be apparent to the eye, but it will be relatively large in view of the necessity of preserving the accuracy of alignment of work held by the collet to the order of magnitude of a thousandth of an inch.

The reason for the variation in alignment will be considered with particular reference to Figs. 19, 20 and 21, and the manner in which the effect is eliminated will then be described. It must be stated first that the figures are suggestive only, as the magnitude of the inaccuracy is such that it could be positively shown in the drawings only by the use of a prohibitively large scale. If the collet segments are free from disturbing strains, they will be symmetrical with respect to the work piece or arbor, both when contracted as in Fig. 12 and when expanded as in Figs. 16 and 20. If, however, one of the segments is subjected to a strain causing it to deflect from its true position when contracted, a condition will result which is shown greatly exaggerated in Fig. 19. The inner surface 66 of the collet segment was lapped true upon an arbor of the diameter of the largest work piece for which the collet is designed, and is, therefore, concentric with the arbor and with the other segments at this diameter. The distortion resulting from the deflection of the segment to the diameter of the small arbor 63 on which the collet is mounted for grinding will cause the inner surface 66 to be asymmetrical with respect to the surface of the arbor 63, as is clearly shown in Fig. 19. The surface 66 and the surface of the arbor are necessarily eccentric owing to the difference in their radii, and the asymmetry referred to is evidenced by the center of the surface 66 not contacting with the arbor, and by the centers 64 and 75' of the segment and arbor respectively not being in line with the center of the surface 66.

The segment being clamped in this asymmetrical position by the chuck 61, the grinding of the outer surface 68 will likewise be both eccentric and asymmetrical with respect to the inner surface 66. This is shown in Fig. 19 by the position of the line 71 representing the intersection of the surface 68 with the end of the collet segment. When the collet so ground is expanded, the inner surface will resume its symmetrical position with respect to the large arbor or work piece 76, while the ground outer surface 68 is eccentric with respect both to the arbor and to the enveloping conical surface 32. This condition results in the outer surfaces 68 of the several sections making contact with the enveloping cone under non-uniform conditions. As the collet is forced against the cone until the segments are all in contact both with the cone and with the work piece, the work piece will be shifted sideways a slight amount until this state of contact will result. This means that the work piece and the cone will be eccentric with respect to each other, and as the cone is necessarily the definitely located part of the collet assembly, the work piece will be held or rotated in an eccentric manner.

To remedy this defect in cases where it arises, I have devised the following corrective treatment, which is so simple that it is generally cheaper to treat all the collets under manufacture than to test them to see which ones are sufficiently free from error to make treatment unnecessary. The treatment consists in clamping the collet, already ground upon the small arbor 63, to a large arbor 77, and in then giving to the outer surfaces 68 a slight second grinding in a manner similar to that in which the first grind was given. Since the second grinding is upon a larger radius than that of the originally ground surface, it is apparent that only the center, or high area, of the surface 68 will be affected. The surface ground on the second operation is indicated in Figs. 22 and 23 at 79. These figures show the area 79 as being in the center of the collet segment; but it will be understood that in the case of a distorted segment such as that shown in Fig. 19, the reground area will be to one side or the other of the center. In actual inspection of collets prepared in accordance with this disclosure, it is interesting to see the varying positions of the reground areas of the several segments, depending upon the amount of distortion present in each segment. The regrinding is preferably done on a large arbor of substantially the same size as the lapping arbor 60, but the exact size is not of importance as long as it is near the diameter of the largest work piece with which the collet is intended to deal.

In collets so subjected to a double grinding, each end segment will have its outer socket-engaging face built up of a median portion 79 and a marginal portion 68. The median portion 79 is a fragment of a surface of revolution (preferably spheroidal), whose geometrical or generating axis is coincident when the collet is expanded with the axis of arbor 77 and, therefore, with the geometrical axes of the inner faces 66. The marginal portion 68 is the residue of the surface resulting from the grinding operation shown in Fig. 8, and when the collet is contracted has its geometrical axis coincident with that of the small arbor 63. When the collet is expanded, the individual geometrical axes of the marginal portions of the several segments are spaced about the axis of the collet as shown at 75 in Fig. 22. In the case of distorted segments the so-called median portion will not be exactly in the center of the socket-engaging face, but it will have the geometrical or generating axis of the surface of revolution of which it is a fragment disposed as stated. At small diameters, the surface 68 provides the contact with the eneveloping cone 32, but it is replaced in this regard by the surface 79 at large diameters. The work piece held by the collet will thus be concentric in both extreme conditions. Ordinarily this will be sufficient to keep the errors below the value at which they become of importance; but if a still further refinement is desired, one or more additional regrindings may be given at intermediate diameters. The result of this will of course be to cover the tapered end surfaces of the collet segments with a plurality of ground surfaces, each of which is strictly accurate at but one diameter, but the maximum error of which can be kept within any assigned limits.

Preferably the grinding wheel which is used to give the regrinding described has a radius of curvature of its shaped grinding face slightly greater than that by which the first ground surface was generated. The ground surface 80 will be slightly flatter than the surface 69, as shown in Fig. 24. This is not essential, but gives a desirable condition as it will be apparent from Fig. 17 that the point of contact between the collet and the cone when the collet is expanded is rather close to the outer edge of the ground surface. This change in the radius of the generated surface thus increases the size of the reground area in the direction where it is most needed.

Claims:

1. A chucking device of the type adapted for use with opposed relatively movable sockets of generally conical internal form and comprising a tubular member having slots extending alternately from opposite ends of the member nearly the entire length thereof to provide end segments joined by flexible connecting bars, in which the end segments are hardened to give permanence to their surface formation and the connecting bars are tempered to permit a controlled expanding and contracting movement of the end segments of a considerable amplitude, and in which the end segments each have inner work-gripping faces and outer socket-engaging faces all curved transversely of the member in the form of surfaces of revolution, said faces being so formed that when the member is in expanded condition the work-gripping faces have their geometrical axes all coincident with the axis of the member as a whole, while the socket-engaging faces have their individual geometrical axes spaced about said common axis, and when the member is contracted the socket-engaging faces have their geometrical axes all coincident with the axis of the member as a whole, while the work-gripping faces have their individual geometrical axes spaced about said common axis.

2. A chucking device of the type adapted for use with opposed relatively movable sockets of generally conical internal form and comprising a tubular member having slots extending alternately from opposite ends of the member nearly the entire length thereof to provide end segments joined by flexible connecting bars, in which the end segments are hardened to give permanence to their surface formation and the connecting bars are tempered to permit a controlled expanding and contracting movement of the end segments of a considerable amplitude, and in which the end segments each have inner work-gripping faces curved transversely of the member in the form of surfaces of revolution, and outer socket-engaging faces curved both transversely and longitudinally of the member in the form of generally spheroidal surfaces of revolution tapering off in size towards the ends of the member, said work-gripping and socket-engaging faces being so formed that when the member is in expanded condition the work-gripping faces have their geometrical axes all coincident with the axis of the member as a whole, while the socket-engaging faces have their individual geometrical axes spaced about said common axis, and when the member is contracted the socket-engaging faces have their geometrical axes all coincident with the axis of the member as a whole, while the work-gripping faces have their individual geometrical axes spaced about said common axis.

3. A chucking device of the type adapted for use with opposed relatively movable sockets of generally conical internal form and comprising a tubular member having slots tending alternately from opposite ends of the member nearly the entire length thereof to provide end segments joined by flexible connecting bars, the outer socket-engaging face of each of said end segments having median and marginal portions shaped as surfaces of revolution of different curvature characteristics, the faces being so formed that when the member is in expanded condition the median portions of said faces have their geometrical axes coincident with the axis of the member as a whole while the marginal portions have their individual geometrical axes spaced about said common axis, and when the member is contracted the marginal portions of said faces have their geometrical axes coincident with the axis of the member as a whole while the median portions have their individual geometrical axes spaced about said common axis.

4. A chucking device of the type adapted for use with opposed relatively movable sockets of generally conical internal form and comprising a tubular member having slots extending alternately from opposite ends of the member nearly the entire length thereof to provide end segments joined by flexible connecting bars, the inner work-engaging face of each of said segments being curved transversely of the member in the form of a surface of revolution and the outer socket-engaging face of each of said end segments being tapered off toward the adjacent end of the member and having median and marginal portions shaped as surfaces of revolution of different curvature characteristics, the several faces being so formed that when the member is in expanded condition the work-engaging faces and the median portions of the socket-engaging faces have their geometrical axes substantially coincident with the axis of the member as a whole, while the marginal portions of the socket-engaging faces have their individual geometrical axes spaced about said common axis, and when the member is contracted the marginal portions of said faces have their geometrical axes coincident with the axis of the member as a whole while the work-engaging faces and the median portions of the socket engaging faces have their individual geometrical axes spaced about said common axis.

5. A chucking device of the type adapted for use with opposed relatively movable sockets of generally conical internal form and comprising a tubular member having slots extending alternately from opposite ends of the member nearly the entire length thereof to provide end segments joined by flexible connecting bars, in which the end segments are hardened to give permanence to their surface formation and the connecting bars are tempered to permit a controlled expanding and contracting movement of the end segments of a considerable amplitude, the inner work-engaging face of each of said segments being curved transversely of the member in the form of a surface of revolution, and the outer socket-engaging faces being curved both transversely and longitudinally of the member with a tapering off in size towards the ends of the member and having median and marginal portions shaped as generally spheroidal surfaces of revolution of different curvature characteristics, the several faces being so formed that when the member is in expanded condition the work-engaging faces and the median portions of the socket-engaging faces have their geometrical axes substantially coincident with the axis of the member as a whole while the marginal portions of the socket-engaging faces have their individual geometrical axes spaced about said common axis, and when the member is contracted the marginal portions of said faces have their geometrical axes coincident with the axis of the member as a whole while the work-engaging faces and the median portions of the socket engaging faces have their individual geometrical axes spaced about said common axis.

6. A chucking device of the type adapted for use with opposed relatively movable sockets of generally conical internal form and comprising a tubular member having slots extending alternately from opposite ends of the member nearly the entire length thereof to provide end segments joined by connecting bars, the outer socket-engaging face of each of said end segments being formed with a plurality of surface portions of different curvature characteristics, one of such portions contacting with the socket when the member is expanded and another contacting with the socket when the member is contracted.

In testimony whereof I have affixed my signature.

BYRON F. STOWELL.